Feb. 13, 1923.

R. K. IMHOLZ.
SWIVEL COUPLING.
FILED NOV. 7, 1921.

1,445,396.

INVENTOR
R. K. IMHOLZ
By C. B. Birkenbeuel.
His ATTORNEY.

Patented Feb. 13, 1923.

1,445,396

UNITED STATES PATENT OFFICE.

RUDYARD K. IMHOLZ, OF PORTLAND, OREGON.

SWIVEL COUPLING.

Application filed November 7, 1921. Serial No. 513,304.

*To all whom it may concern:*

Be it hereby known that I, RUDYARD K. IMHOLZ, a citizen of the United States, and a resident of Portland, in the county of Multnomah and State of Oregon, have invented a new and useful Swivel Coupling, of which the following is a specification.

This invention relates more particularly to means for attaching a hose to a pump, spray gun or other tool.

The objects of my invention are to provide an exceedingly simple and efficient means for preventing kinking in a hose, especially such as are used for high pressure spraying and for compressed air tools. A further object is to render the use of a spray gun or tool less difficult by not requiring the user to work against the twist which may be in a hose at the commencement of his work, or which may accumulate in the course of his operation.

Still further objects are to prevent the hose from kinking sufficiently to entirely cut off the flow of its contents with resulting injury to the hose structure or to be blown loose from its connections resulting in a waste of materials or air in addition to the loss of time and inconvenience caused thereby.

Figure 1:
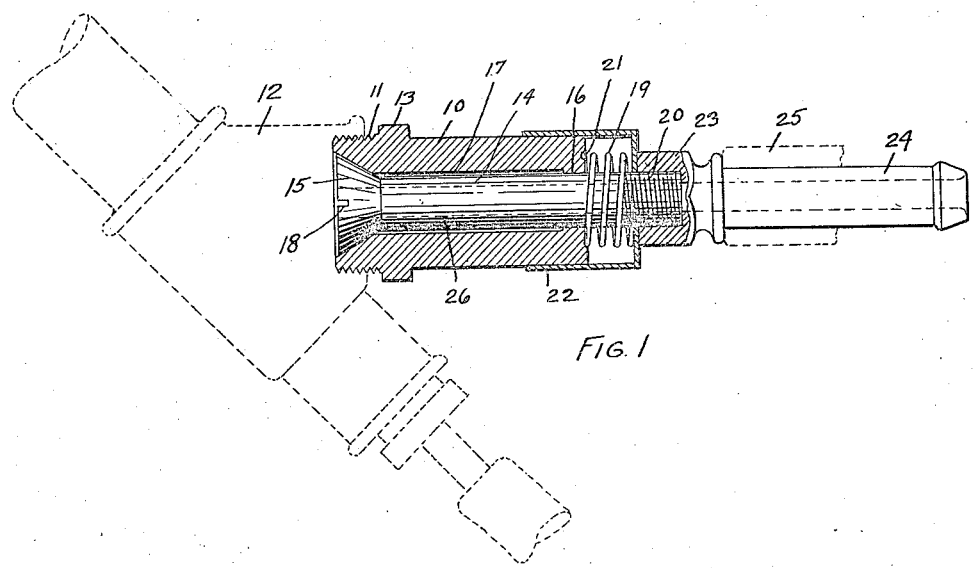
Figures 2, 3, 4:
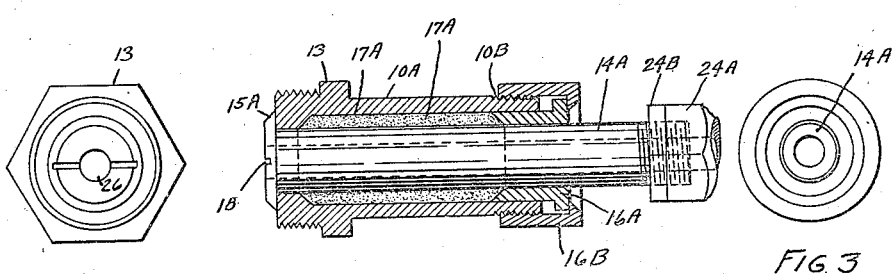
Figure 5:
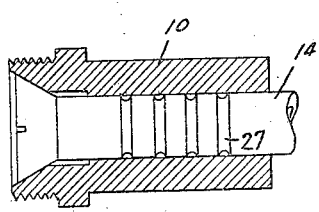

I accomplish these results in the manner set forth in the following specification and illustrated in the accompanying drawing, in which:

Figure 1 is a sectional view through the device showing the manner in which it is attached to a spray gun. Figure 2 is a modified form of same shown in section. Figure 3 is an elevation from the hose end. Figure 4 is an elevation from the gun end. Figure 5 shows a modified form of the device.

Similar numbers of reference refer to the same or similar parts throughout the several views.

Referring in detail to the drawing, I have constructed my device of a tubular shell 10 provided with a threaded end 11 by means of which it is secured to the gun 12. A hexagonal section 13 is provided for tightening purposes. A hollow central stem 14 passes through the length of the member 10 and has a tapered head 15 which is ground in with the member 10. The portion 16 of the member 10 bears freely upon the stem 14, but the remaining section 17 provides considerable clearance. A slot 18 for a screw driver is also provided in the tapered head 15.

A coiled spring 19 is placed around the projecting threaded end 20 of the stem 14 and rests in grooves 21 in the end of the member 10. A shell 22 which slips freely over the member 10 serves to compress the spring 19 slightly and is held in place by screwing a hose fitting 23 as far as it will go upon the threaded portion 20. The shank 24 of the fitting 23 and the manner of securing the hose 25 to same is such as is in common use in the art today. A hole 26 passes through the full length of the stem 14.

In the employment of this device when any kink or twist occurs in a hose or the operator desires to alter the position or angle of his tool he is permitted to do so by the tapered head 15 rotating on its seat, and whereas the spring 19 is merely strong enough to hold the head 15 against its seat in order to prevent foreign matter from finding lodgment therein, the pressure itself is depended upon to hold the head firmly in place and prevent leakage without offering too great resistance against a turning moment.

In Figures 2, 3 and 4 I have illustrated a modification of this device which is similar in every respect except that I employ a packing instead of a ground joint, and in order to permit its use I have threaded the tubular member 10<sup>A</sup> at the end 10<sup>B</sup> and used the straight stem 14<sup>A</sup> having a square shouldered head 15<sup>A</sup>. The member 10<sup>A</sup> is counter-bored to the diameter 17 which space is filled with a packing 17<sup>A</sup> upon which is placed a gland 16<sup>A</sup> which is forced against the packing by the ring nut 16<sup>B</sup> which is preferably knurled.

The female hose coupling 24<sup>A</sup> may in either of these forms be securely locked to their stem by means of a lock nut 25<sup>B</sup> to prevent the fitting from backing off of the stem when not desired.

In Figure 5 I have illustrated another modification of the device shown in Figure 1 whose difference lies in the fact that I have provided a longer straight bearing for the stem 14, which stem is provided with grooves 27 which tend to accumulate moisture escaping past the ground joint and furnish additional safeguard against leakage.

I am aware that there are in existence various forms of swivel couplings such as are used with garden hose and steam hose where other objects are accomplished and in different manners: I therefore do not claim same broadly, but only within the limits of the following claim.

What I claim is:

The combination of a spray gun having a hose attached thereto with a swivel coupling interposed between said gun and hose, said coupling consisting of a tubular member adapted to be threaded into the spray gun, a hollow stem bearing within said tubular member and having a beveled head ground to a joint within said threaded end and having its opposite end threaded and projecting from said tubular member, a spring around said projecting end, a sleeve shouldering against said spring and slipping over said tubular member, and a female hose connection adapted to secure the threaded end of said stem to said hose and bearing against said sleeve in a manner to compress said spring.

RUDYARD K. IMHOLZ.